United States Patent

Wichmann

[11] Patent Number: 5,815,908
[45] Date of Patent: Oct. 6, 1998

[54] METHOD AND APPARATUS FOR PRODUCING A METAL TUBE CONTAINING A LIGHT WAVEGUIDE WITH AN EXCESS LENGTH

[75] Inventor: Franz-Josef Wichmann, Friesoythe, Germany

[73] Assignee: Siemens Aktiengesellschaft, Munich, Germany

[21] Appl. No.: 719,861

[22] Filed: Sep. 25, 1996

[30] Foreign Application Priority Data

Sep. 25, 1995 [DE] Germany .................. 195 35 621.7

[51] Int. Cl.⁶ .................. H01P 11/00; B21B 15/00
[52] U.S. Cl. .................. 29/600; 29/33 R; 57/6; 219/121.64; 219/121.82; 226/1; 385/111
[58] Field of Search .................. 29/600, 33 R; 228/148; 219/121.63, 121.64, 121.82; 226/7, 1; 385/111, 109; 57/6

[56] References Cited

U.S. PATENT DOCUMENTS

| | | |
|---|---|---|
| 4,154,049 | 5/1979 | King et al. . |
| 4,640,576 | 2/1987 | Eastwood et al. . |
| 4,852,790 | 8/1989 | Karlinski . |
| 4,985,185 | 1/1991 | Mayr et al. . |
| 5,143,274 | 9/1992 | Laupretre et al. . |
| 5,263,239 | 11/1993 | Ziemek . |
| 5,582,748 | 12/1996 | Yoshie et al. .................. 228/148 X |

FOREIGN PATENT DOCUMENTS 42 10 633   4/1995   Germany .

Primary Examiner—Carl J. Arbes
Attorney, Agent, or Firm—Hill & Simpson

[57] ABSTRACT

A method and apparatus for producing excess lengths of light waveguides in relation to a metal tube containing the waveguide comprises an arrangement for forming a metal tube and an arrangement for inserting the light waveguides into the metal tube at a greater rate of feed than the advancement of the tube being formed by the arrangement for forming a metal tube. The apparatus and method also include introducing a filling compound into the metal tube upstream of the point of introducing the waveguides and an arrangement of rollers for shaping the formed tube to its final cross sectional shape.

16 Claims, 1 Drawing Sheet

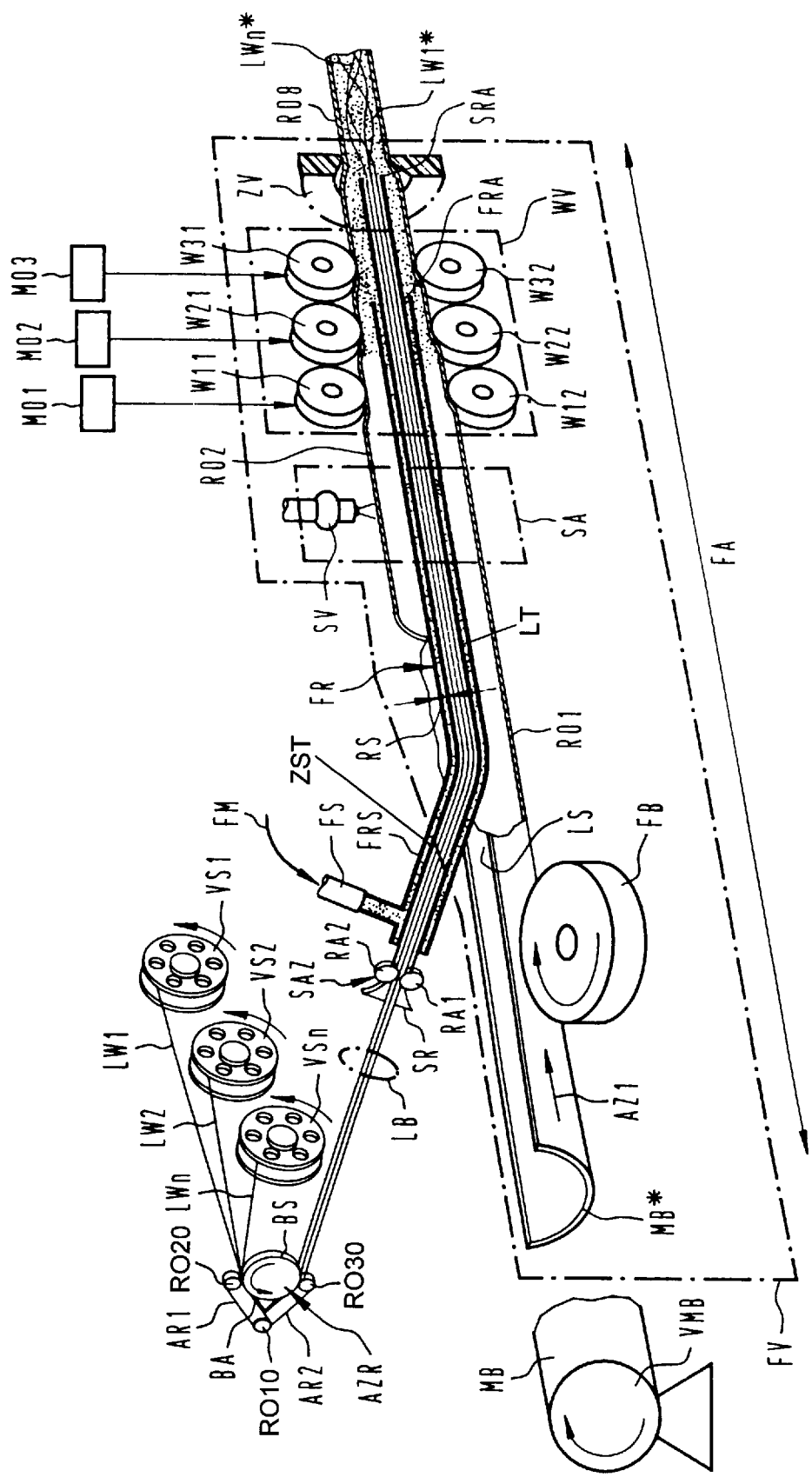

METHOD AND APPARATUS FOR PRODUCING A METAL TUBE CONTAINING A LIGHT WAVEGUIDE WITH AN EXCESS LENGTH

BACKGROUND OF THE INVENTION

The present invention is directed to a method for producing excess lengths in at least one light waveguide in relation to a metallic tube enclosing the waveguide and to the apparatus for performing the method.

In cable technology, in order to enable a particularly reliable protection of light waveguides from mechanical, chemical and/or other stresses, such as, for example, environmental humidity or water vapor, the light waveguides are housed in a metallic tube, in particular with an excess length. Optical transmission elements of this type are preferably used in ocean cables or high-voltage overhead lines. They are distinguished, above all, in that their light waveguides remain largely relieved of strains in the metallic tube, even under highly variable operating conditions, such as, for example, temperature fluctuations, changing tensions, etc. For the manufacture of the optical transmission element of this type, an elongated metal band is formed into a metal tube and at least one light waveguide is introduced into this tube and the tube is welded shut. In practice, it is difficult to install light waveguides in such a metallic tube with an excess length that can be of a predetermined amount, or well-defined.

SUMMARY OF THE INVENTION

The object of the present invention is to produce a defined, predetermined excess length in at least one light waveguide in relation to the metallic tube enclosing the waveguide in a reliable and precisely controlled manner. According to the invention, this aim is solved in a method of the type named above, wherein the light waveguide is inserted into the tube with an advance feed of such a type that the light waveguide comes to lie in the tube with a larger run length than the run length in which the tube is being produced.

Due to the fact that at least one light waveguide is inserted into the tube with this advance feeding, a particularly effective production of excess length in the light waveguide can be obtained.

The invention further concerns an apparatus for carrying out the inventive method, which apparatus is characterized in that the means for feeding the light waveguide into the tube are provided so that the light waveguide comes to lie in the tube with a larger run length than the run length of the finished tube.

Other advantages and features of the invention will be readily apparent from the following description of the preferred embodiments, the drawing and claims.

BRIEF DESCRIPTION OF THE DRAWING

The FIGURE is a schematic perspective view with portions in cross section and removed for purposes of illustration of an apparatus for carrying out the inventive method of the present invention.

DESCRIPTION OF THE PREFERRED EMBODIMENTS

The principles of the present invention are particularly useful in a method of forming a finished tube RO8 of the FIGURE containing light waveguides LW1*–LWn*, which have an excess length and are embedded in a filling compound FM.

To accomplish this goal, the method of the present invention forms a tube by drawing a metal band MB, which is in a first, preferably planar, flat condition, from a fixed supply spool VMB. By means of a sequence-forming apparatus FV, outlined in broken lines in the Figure, this metal band MB is continuously formed into a metallic tube which, in its fmal state upon leaving the forming apparatus FV, is preferably of an approximately circular cylindrical shape. In the forming apparatus FV, the metal band MB is transported forward, essentially in a straight line, along a forming segment FA in a haul-off direction AZ1 from the spool. For the illustration of the continuously progressive forming process of the originally planar, flat metal band MB is bent into an approximately circular cylindrical tube RO8, which is circumferentially closed at the output of the forming segment FA, in the Figure. The band MB is additionally shown in perspective in the first intermediate state, for example the preliminary state, as a semicircular cylinder, and is designated MB*.

The first forming step, which forms the band into a tube having a longitudinal slot, can be carefully carried out, for example by using corresponding shaped rollers which press on the metal band MB externally on both sides and bend the band MB in the desired manner. For the clarity of the drawing, in the FIGURE, only one forming roller FB is shown, which is representative of other corresponding forming tools. A second forming roller is usefully allocated to the forming roller FB on an opposite side of the semicircular cylindrically formed metal band MB*, which second roller serves as a thrust roller for the forming roller FB and is fashioned corresponding to the forming roller FB.

Preferably, several pairs of forming rollers of this type, having a respective forming roller at both sides of the longitudinal extension of the metal band MB, are arranged successively in the longitudinal direction. In this way, the metal band is formed into an opened tube RO1 with a longitudinal slot LS. The tube has a substantially circular cylindrical shape, which tube, regarded in the haul-off direction AZ1 from the spool, comprises a longitudinal slot LS running approximately in a straight line. Along the longitudinal slot LS, the two band edges of the metal band MB stand in abutment against one another as much as possible for welding. In the FIGURE, the longitudinal slot LS essentially runs along a mid-axis of the upper side of the tube RO1.

At the same time as the process of forming the metal band MB into the tube RO1 having a longitudinal slot, light waveguides LW1–LWn are drawn from supply spools VS1–VSn, which are mounted for rotation, in particular with regard to their central longitudinal spooling axis. A light waveguide apportioning outlet device AZR is allocated to the supply spools VS1–VSn, which outlet effects the common drawing of the light waveguides LW1–LWn from the supply spools VS1–VSn. The supply spools VS1–VSn are provided with braking means, so that the light waveguides LW1–LWn can be transported forward under a rigid tension from their supply spools VS1–VSn up to the apportioning outlet device AZR. It can possibly also be useful to drive the supply spools VS1–VSn under a corresponding regulation of tension. In the Figure, by way of example, a rotationally driven band disk BS is provided in the outlet device AZR, which band disk BS is preferably fashioned with a circular cylindrical shape. The light waveguides LW1–LWn are commonly positioned in parallel next to one another on a partial segment of the outer circumference of the disk BS. They are frictionally held in place there by means of a haul-off belt BA that is pressed on the light waveguides LW1–LWn at the outer circumference of the band disk BS, and the light waveguides are, thus, transported forward by the driven band disk BS. The haul-off belt BA in the FIGURE is thereby gripped by means of two bearer arms AR1 and AR2 in the form of two separate pivotable arms that, respectively, extend in a straight line. The haul-off belt thus respectively runs endlessly around the respective bearer arms AR1 and AR2, which arms form, preferably, an isosceles triangle, which respectively lies tangentially on an outer circumference of the circular band disk BS. The arms are connected centrally with one another in a joint manner via a roller RO10 so that they can rotate away for the application of the light waveguides LW1–LWn on the outer rim of the band disk BS. At the free outer ends of each of the arms AR1 and AR2, rollers RO20 or RO30 are mounted, respectively. By means of friction, the haul-off belt BA, thus, runs approximately synchronously along with the driven band disk BS along the first bearer arm AR1 between the rollers RO10 and RO20, as well as along the second bearer arm AR2 between the rollers RO30 and RO10, as indicated by an arrow on the disk BS. In addition, or independent of the band disk BS, it can also be useful, if warranted, to drive the haul-off belt BA separately.

By means of the apportioning outlet device AZR, the light waveguides LW1–LWn are, at the same time, combined into a light waveguide bundle LB. This light waveguide bundle LB is identified in the FIGURE by means of a broken-line circle. The light waveguides LW1–LWn thus lie parallel next to one another in a common position plane. By means of the apportioning outlet device AZR, the light waveguides LW1–LWn are arranged, for example, in positional relationship and are fed essentially along straight lines to the entrance of an elongated support tube SR, which entrance tapers conically in the haul-off direction and is arranged after the apportioning outlet device AZR.

In the area of the entrance to the support tube SR, a light waveguide thrust conduit or device SAZ is provided. This thrust conduit SAZ is formed by two rotationally driven rollers RA1 and RA2, which roll on one another and frictionally carry the light waveguide bundle LB along therebetween. The two rollers RA1 and RA2 are usefully provided on their running surfaces with a rubber coating or some other frictional coating. The thrust conduit SAZ is usefully regulated with respect to tension so that the light waveguides LW1–LWn are drawn taut from the apportioning outlet device AZR, and so that slippage of the light waveguides LW1–LWn between the rollers RA1 and RA2 of the thrust conduit is largely avoided. In this way, the light waveguides LW1–LWn of the light waveguide bundle LB are gripped at the entrance to the support tube SR by means of the two rollers RA1 and RA2, and are inserted or introduced into the support tube SR in an essentially taut and rectilinear manner. The thrust conduit SAZ thus effects the introduction or, respectively, the advance feed of the light waveguides LW1–LWn into the support tube SR, for example an advance feeding force works along with the light waveguides in the support tube SR. A swerving or, respectively, spreading in the radial direction in relation to the rectilinear longitudinal extension of the individual light waveguides LW1–LWn lying next to one another in parallel in a common position plane upon introduction into the support tube SR is thus largely prevented. Preferably, a pulling force of at most 50 cN, in particular in a range between 5 cN and 10 cN, is exerted per fiber on the light waveguides LW1–LWn along their run path between the apportioning outlet device AZR and the thrust conduit SAZ.

The light waveguide apportioning outlet device AZR preferably draws the light waveguides LW1–LWn with a speed that is greater by a predetermined speed or rate percentage amount greater than the haul-off speed or rate for the finished tube RO8. This speed percentage amount preferably corresponds to the desired excess length percentage amount of the light waveguides in the finally formed tube RO8. The thrust conduit SAZ preferably comprises approximately the same haul-off speed as the apportioning outlet device AZR. For this purpose, the thrust conduit SAZ can usefully be coupled with the apportioning outlet device AZR. If warranted, the haul-off speed of the thrust conduit SAZ can be raised by an additional portion of speed corresponding to the amount of speed lost through possible slippage of the waveguide relative to rollers RA1 and RA2.

The support tube SR is essentially of a circular cylindrical shape with an angled supply support ZST connected to a longitudinal part LS. At the input side, the tube SR is introduced into the interior of the opened tube RO1 through a longitudinal slot LS. For better illustration of the light waveguide supply system, the opened tube RO1 having the longitudinal slot LS is shown in an open view, for example in a longitudinal section, in the region of the introduction of the support tube SR. The support tube SR extends essentially in a straight line along its sub-section at the input side as the supply support ZST arriving at an angle. The tube then bends in the longitudinal course of the tube RO1 in such a way that the longitudinal part LT extends into the interior of the opened tube RO1 essentially in a straight line. The support tube runs with the longitudinal part LT in the interior of the metallic tube RO1 or, respectively, RO2, preferably up to the end at the output side of the forming segment FA. Regarded in the haul-off direction AZ1, the part LT thus extends approximately from the longitudinal location at which the opened tube RO1 having the longitudinal slot LS is formed past the welding area of a subsequent welding apparatus SV, as well as past the roller segments of a further subsequent arranged roller apparatus WV up to an exit of the forming apparatus FV. The tube, which has its edges longitudinally welded with the welding apparatus SV, is thereby designated RO2 and is a intermediate tube.

The support tube SR serves the purpose, in particular, of supporting the light waveguides LW1–LWn circumferentially from the outside up to the introduction or, respectively, the release of the waveguide into the finally formed tube RO8. The support tube SR thus supplies a guide for the light waveguides until the metallic tube has been brought into its final form at the exit of the forming segment FA. Only then does it allow the light waveguides to enter the tube in a freely movable manner. By this means, lateral excursions, particularly radial ones, of the light waveguides LW1–LWn, or a lateral axial swerving of these light waveguides in relation to their longitudinal extensions, are largely avoided, particularly in relation to the longitudinal movement of the central axis of the support tube SR so that the defined entry relationships are provided for the light waveguides. The light waveguides LW1–LWn thus follow the longitudinal course of the central axis of the support tube SR, for example the defined path curve is predetermined for them and a defined through length is thereby allocated. For this purpose, the support tube SR usefully comprises an inner diameter such that the light waveguide LW1–LWn can be guided along in them with only a small amount of play. The light waveguide bundle LB is preferably guided in a support tube SR with a play of $2/10$ mm at most, in particular, preferably 1/10 mm play at most. An undulation of the light waveguides LW1–LWn in the interior of the support tube SR along its longitudinal extension is thereby largely avoided. The inner diameter of the support tube SR is preferably chosen between 0.1 mm and 10 mm and, in particular, the preferred range is 0.5 mm to 3 mm. The support tube SR preferably extends along an overall length of between 60 mm and 2000 mm.

In order that the light waveguides LW1–LWn come to lie in the finally formed tube RO8 with a defined excess length, the light waveguides LW1–LWn are pushed through the support tube SR with a larger run length than the through run length produced by the output of the forming segments FR for the finished rectilinearly extending tube RO8. For this purpose, the light waveguide thrust conduit SAZ, as a means for the advance feeding of the light waveguides LW1–LWn into the tube RO2, is usefully operated in such a way that the light waveguides LW1–LWn are pushed forward with a higher haul-off speed than the finally formed tube RO8, which extends rectilinearly and is essentially of a circular cylindrical construction. The difference between the further-inserted light waveguides and the production length of the finally formed tube RO8 then determines the excess length with which the light waveguides LW1–LWn come to lie in the interior of the tube RO8. The light waveguides LW1–LWn are usefully inserted into the finally formed tube RO8 with a through or run length greater by about 0.1% to 0.7%, an preferably in a range of 0.2% to 0.6%, in relation to the production through length of the finally formed tube RO8. Thus, the preferred rate of feed for the waveguide is in a range of 100.2% to 100.6% of the rate of feed for forming the tube RO8.

The support tube SR forces the light waveguides LW1–LWn to take an essentially rectilinear path in the opened tube RO1 and intermediate tube RO2 so that the defined entry length for the light waveguides LW1–LWn is ensured. A free path is not enabled for the light waveguides LW1–LWn until after the emergence of the light waveguides LW1–LWn from the opening or end of the support tube SR at the output side. Since the light waveguides LW1–LWn are inserted into the finally formed tube RO8 with excess length, there occurs there a lateral, in particular radial, excursion of the light waveguides LW1–LWn in relation to the central axis of the tube RO8, which excursion is limited by the inner boundary of the tube RO8. In particular, the light waveguides LW1–LWn distribute themselves helically in the finished tube RO8; for example, they are radially spread apart in relation to their previously forced approximately rectilinear longitudinal extension. In this final state, the light waveguides are designated LW1*–LWn*. Due to the fact that the support tube SR in the tube RO1, RO2 extends essentially rectilinearly, a particularly simple, direct, unambiguous allocation of the inserted run length of the respective light waveguide to the produced through or run length of the finally formed metallic tube RO3 is provided. In this way, a particularly precise adjustment of the excess light waveguide length is enabled. The degree of excess length produced is, in particular, determined directly by the advance feeding speed of the thrust conduit SAZ, which considerably simplifies the control and regulation of the excess length production.

If warranted, there is arranged around the support tube SR an elongated filler tube FR with a spacing such that an annular gap duct RS, for the possible introduction of a filling compound, is formed between the support tube SR and the filling tube FR. In particular, the filling tube FR surrounds the support tube concentrically so that the coaxial double-arrangement of the support tube SR and the filling tube FR is formed. The support tube SR and the filling tube FR are preferably of an essentially circular cylindrical construction, so that an annular gap duct RS, which has an approximately circular annular shape in cross section, is formed. The filler tube FR is, therefore, usefully sealed in the entry area of the support tube SR. The filler tube FR follows the course of the support tube SR and ends just in front of the exit of the support tube SR. At the input side, the filling compound FM is pumped into the annular gap duct RS by means of a filler nozzle. The filling compound FM preferably has a paste-like consistency that remains soft. In particular, thixotropic agents are thereby mixed into it in order to enable the finished optical transmission element, which is formed by the metallic tube RO8 with the inserted light waveguides, to be made largely watertight in a longitudinal direction.

The width of the annular gap RS is preferably chosen to be at least equal to 0.2 mm and, in particular, lies in a range of 0.2 mm to 1 mm. The filler tube FR preferably ends upstream of the end of the support tube SR; for example, the end of the support tube SR projects beyond the exit of the filler tube FR. The support tube preferably projects by at least 100 mm and, preferably, in a range of 200 mm to 400 mm beyond the end of the filler tube. The filler tube preferably extends approximately to the center of the roller arrangement WV, which is arranged along the end segment of the output side of the forming apparatus FV. In contrast, the support tube SR does not end until later, regarded in the haul-off direction AZ1, in particular not until the output area of the roller arrangement WV or, respectively, a drawing apparatus ZV possibly arranged subsequent to the roller apparatus WV, or even extending beyond these devices. Thus, by means of the filler tube FR, the filling compound FM is brought into the tube RO2 already at a time before the tube has been drawn down to its final diameter. By this means, it is largely ensured that the filling compound FM completely fills the interior of the finally formed tube RO8 after the completion of the roll forming process or, respectively, of the subsequent drawing process.

The support tube usefully comprises an inner diameter that is at least 2/10 mm smaller than the inner diameter of the finished tube RO8. The filler tube usefully comprises an outer diameter that is at least 5/10 mm smaller than the inner diameter of the intermediate or welded tube RO2. The outer diameter of the filler tube FR is preferably chosen between 5 mm and 6 mm.

For the support tube SR and/or the filler tube FR, a metallic material is preferably chosen, in particular hard-drawn special steel. Due to the inherent stability in the high mechanical and thermal loading capacity of this material, largely defined entry relationships are predetermined for the light waveguides and/or the filling compound.

By inserting the filling compound FM into the tube before supplying the light waveguides LW1–LWn, an additional advantageous contribution is made to the prevention of a pushing back of the light waveguides against or opposite to the haul-off direction AZ1. With the run lengths with which the light waveguides LW1–LWn are inserted into the finally formed tube RO8, the light waveguides thus also come to lie in the tube RO8. For this purpose, a particularly tough filling compound is chosen, in particular, which also supports the securing of the position of the light waveguides on the basis of the frictional forces that become effective in the filling material.

After the introduction of the support tube SR and the filler tube FR through the longitudinal slot LS into the tube RO1, the band edges of the tube RO1 having the longitudinal slot are longitudinally welded along the slot LS using a subsequent welding apparatus SV, in particular a laser or a welding electrode, so that the tube is circumferentially closed and a sealed intermediate tube RO2 is formed. Before the subsequent forming process by roller, the tube RO2 preferably comprises an inner diameter between 3 mm and 10 mm. The tube RO2 is subsequently reduced in diameter and lengthened by means of a roller apparatus WV following the welding apparatus SV.

The roller apparatus comprises rollers acting on the outer diameter of the welded tube RO2, which rollers are driven to rotate in a longitudinal direction. For example, two rollers are respectively allocated to one another, which rollers are on opposite sides of the tube RO2 on the outer casing thereof. The two rollers respectively allocated to one another thereby enclose the passing tube RO2 therebetween and give it a passage opening of a fixed, desired cross sectional shape. In particular, an opening of an approximately circular cylindrical shape is respectively provided between the two rollers rolling on one another, and the shape of the cross section of this opening is stamped or, respectively, pressed onto the passing tube RO2. The wall material of the tube thereby comes to yield through the plastic deformation.

Along the direction of passage AZ1, in the Figure, three pairs of rollers W11/W12, W21/W22 and W31/W32 are arranged one after the other as an example. The pairs of rollers are thereby drawn only schematically. Along the haul-off direction AZ1, the passage opening between the rollers of the pair is made smaller per roller pair by steps in the haul-off direction AZ1, and a successive reduction of the diameter of the tube RO2 is thereby achieved. The second pair of rollers W21/W22 are thus driven closer to the central axis of the tube RO2 than the first pair of rollers W11/W12. Finally, the third pair of rollers W31/W32 comprises a passage opening in relation to the second pair of rollers W21/W22 that is made still smaller in relation to the first pair of rollers W11/W12. A drive apparatus MO1–MO3, in particular a motor, is respectively allocated to each pair of rollers W11/W12, W21/W22 and W31/W32. The haul-off speed of the roller pairs W11/W12, W21/W22, W31/W32 is successively increased per roller pair in the haul-off off direction AZ1 so that the tube RO2 is drawn along the roller path.

By means of the rolling, in particular a reduction of the outer diameter of the tube RO2 is achieved, and the tube is pressed into the final form and, at the same time, a lengthening will be achieved. Between one and ten pairs of rollers, and preferably between three and seven pairs of rollers, are arranged in series one after the other. Per roller pair, an elongation, for example a lengthening of the tube in relation to its original run length before the respective roller pair, of between 5% and 20% is achieved, and preferably between 5% and 15%. Since the thickness of the wall of the tube remains essentially constant during the rolling process, there results per roller pair a reduction of the annular wall cross sectional surface that is, likewise, between 5% and 20%, or in the preferred range of 5% and 15%, in relation to the cross sectional surface before the respective rolling process. The tube is preferably lengthened overall between 10% and 70% of its original length upon approaching the roller apparatus WV. The finally formed tube RO8 preferably comprises an inner diameter between 1 mm and 10 mm.

If warranted, it can also be useful to provide at least one drawing apparatus, in particular at least one stationary drawing plate or die, in addition to the roller apparatus WV. In the FIGURE, a drawing plate ZV is shown in cross section and in broken lines after the roller apparatus WV. A drawing plate or die of this type comprises a conically tapering passage opening having a predetermined cross sectional measurement. By means of the drawing plate or die ZV, in particular another terminal elongation, in particular a reduction of the wall cross sectional surface, or smoothing of the rolled tube RO2 can be carried out, so that the finally formed tube RO8 is obtained. Subsequently, the inventive optical transmission elements fashioned in this way are supplied to the further processing unit or wound onto a conventional supply spool. For reasons of clarity, these have been omitted from the FIGURE. At least one tube, such as, for example, RO8 with the light waveguides fed in this excessive length, is installed preferably in ocean cables or is stranded with conductors of high-voltage overhead lines.

The supply system formed by the support tube SR and the filler tube FR also serve, in particular, the purpose of providing the filling compound FM and/or the light waveguides LW1–LWn with a shielding or, respectively, insulation in the area of the welding apparatus SV when the tube or pipe edges are welded together. The support tube SR and the filler tube FR thus, respectively, provide a circumferential sealed guide duct through the welding area, which protects the light waveguides and/or filling compound in the welding area from thermal stress. The casing of the filler tube FR already works as a thermal insulation for the filling compound FM. It is also particularly useful to arrange the filler tube FR and the support tube SR contained therein as much as possible on the inner side of the tube RO1 that lies opposite the longitudinal slot LS to be welded. If, for example, the tube RO1 is sealed from above using the welding apparatus SV, it is useful to have the concentric double arrangement of the filler tube FR and the support tube SR extend along the base of the tube RO1 on the inner wall lying opposite to the point of welding. In this way, the spacing between the welding apparatus SV and the filler tube FR and the support tube SR is kept as large as possible, so that the intensity of the heat radiation generated by the welding process is already somewhat attenuated at the location of the filler tube FR. An overheating of the filling compound FM is thereby largely avoided. In particular, a possible splitting-off of hydrogen from the filling compound FM is counteracted, which otherwise could possibly lead to an increase in the transmission dampening of the light waveguides LW1–LWn.

Since the support tube SR is embedded inside the filling compound FM of the filler tube FR, a still more effective thermal insulation or, respectively, barrier is provided for the light waveguides LW1–LWn than for the filling compound FM itself. Therefore, the light waveguides LW1–LWn are then also still mechanically and thermally separated from the welding joint by the filling compound FM as well as by the casing of the support tube SR. In particular, the filling compound FM surrounds the support tube SR as a thermally insulating material and, thus, prevents an unacceptably strong heating of the light waveguides LW1–LWn. For this purpose, it may already be sufficient to supply the filling compound at room temperature. It is particularly useful to pump the filling compound FM into an annular gap duct RS in a cooled state. In this way, the light waveguides LW1–LWn can be led under the welding apparatus SV without difficulty and without unacceptably high heating. In particular, the release of hydrogen, such as, for example, from the light waveguide coatings, which may be either a primary and/or secondary coating, is thereby largely prevented.

Due to the fact that the light waveguides in the guide tube SR and of the filling compound FM in the filler tube FR are respectively led through the region of the welding of the joint in a hermetically sealed fashion, hydrogen that may have been released in the welding process outside of the support tube and/or the filler tube can also be largely prevented from being carried into the finished, circumferentially sealed tube RO8 and remain there permanently. Such hydrogen can, for example, also be released during the melting of the metal of the tube RO1. Furthermore, it can also, for example, happen that with humid air, the moisture in the air in the welding region can split, releasing hydrogen. Since the filler tube FR and the support tube SR extend far beyond the welding area in the haul-off direction, a penetration of hydrogen, which was possibly released outside the support tube or filler tube, into the interior of the finished tube RO8 is counteracted, in a particularly effective manner. To a certain extent, the filling compound brought into the tube in front of the light waveguide thereby operates, in particular, as a water vapor block, since it essentially covers the entire surface of the inner cross section of the tube in the exit area of the filler tube and occludes the interior of the finished tube RO8 in the manner of a stopper or plug in the outward direction at the welding joint.

Additional components are thus provided between the welding joint and the light waveguides and/or the filling compound, in particular regard in the radial direction, by which means the heat radiation can no longer penetrate unhindered into the filling compound and/or the light waveguides. The filling compound and/or the light waveguides, thus, do not stand in immediate contact with the welding joint and can, thus, be reliably protected from unacceptably high thermal stresses.

If warranted, it can also be useful to insert an elongated swelling thread or swelling wool into the metallic tube, in place of the filling compound FM, using the annular gap duct.

The inventive method for producing excess light waveguide lengths enables the insertion of a number of light waveguides into each finished metallic tube. The number can be in a range of 1 to 100 waveguides, and preferably is in a range of 1 to 50 waveguides.

Although various minor modifications may be suggested by those versed in the art, it should be understood that I wish to embody within the scope of the patent granted hereon all such modifications as reasonably and properly come within the scope of my contribution to the art.

I claim:

1. A method for producing excess lengths of at least one light waveguide in relation to a metallic tube enclosing the waveguide, said method comprising the steps of forming the metallic tube being transported forward in a first direction essentially in a straight line along a forming segment, and inserting at least one light waveguide into an interior of the moving tube with an advance feed so that the light waveguide comes to lie in the tube with a longer run length than the through run length of the produced metallic tube, the step of inserting at least one light waveguide including guiding each light waveguide in an elongated support tube extending essentially rectilinearly in the interior of the metallic tube up to an end of an output side of the forming segment until the metallic tube has been brought into a final form and only releasing the waveguide into the finally formed metallic tube and pushing each light waveguide through the support tube with a higher haul-off speed than a rate of transporting the finally formed metallic tube so that the light waveguide comes to lie in the finally formed metallic tube with an excess length.

2. A method according to claim 1, wherein the step of forming the tube forms the tube from a metal band.

3. A method according to claim 1, which includes filling the moving metallic tube with a filling compound upstream of a point of the insertion of the light waveguides in such a way that the light waveguides inserted downstream of the filling compound have an excess length and are embedded in the filling compound.

4. A method according to claim 1, wherein the step of inserting the light waveguides inserts the light waveguides helically in the finally formed metallic tube.

5. A method according to claim 1, which includes inserting a filling compound into the moving tube prior to inserting the waveguides, said step of inserting the filling compound includes guiding the filling compound in an elongated filler tube for insertion into the moving metallic tube.

6. A method according to claim 1, wherein the step of inserting the light waveguides includes guiding the light waveguides in an elongated support tube extending into the metallic tube, and includes providing a filling tube surrounding the support tube to form an annular gap duct terminated upstream of the end of the support tube, and moving a filling compound through the annular gap duct for discharge into the metallic tube prior to inserting the light waveguides from the support tube.

7. A method according to claim 1, wherein the step of forming the metallic tube forms the metallic tube out of a band having edges forming a slot and then welding the edges of the band together to form a closed tube, said step of inserting the light waveguide includes guiding each waveguide in the elongated support tube extending through said slot and terminating downstream from the point of joining the edges of the band to form the closed tube, said method including providing a filling tube surrounding a portion of the support tube to form an annular duct therebetween, said duct terminating upstream of the end of the support tube and forcing filling material through said annular duct for discharge into the closed tube prior to insertion of the waveguide.

8. An apparatus for producing excess lengths of at least one light waveguide in relation to a metallic tube enclosing the waveguide, said apparatus including first means for forming the metallic tube being transported in a first direction essentially in a straight line, said first means shaping the metallic tube into a final form of a finished tube at an output side of the first means, and second means for inserting the at least one light waveguide into the moving metallic tube, said second means including an elongated support tube being introduced into the metallic tube at an input end of the first means and extending essentially rectilinearly in an interior of the metallic tube up to an exit end at the output side of the first means, said second means including thrust conduit means for pushing each light waveguide through the support tube and out the exit end into the finished tube with a greater haul-off speed than the speed at which the finished tube is being transported in the first direction so that the waveguide is only released into the finished tube and comes to lie in the finished tube with an excess length.

9. An apparatus according to claim 8, wherein the second means includes a filler tube for introducing a filling compound into the metallic tube.

10. An apparatus according to claim 9, wherein the filler tube surrounds the support tube in essentially a concentric fashion.

11. An apparatus according to claim 10, wherein the filler tube extends essentially in a straight line.

12. An apparatus according to claim 11, wherein the support tube projects beyond the end of the filler tube.

13. An apparatus according to claim 12, wherein the first means provides rollers at an exit area of the filler tube for bringing the metallic tube into a final cross sectional shape of the finished tube.

14. An apparatus according to claim 8, wherein the first means includes forming tools for bending a metal band into an open tube having a gap extending between the edges of the band.

15. An apparatus according to claim 14, wherein the elongated support tube is inserted through the gap between the edges of the opened tube and said first means includes welding means for joining the edges together to close the metallic tube positioned between the exit end of the support tube and the forming tools.

16. An apparatus according to claim 15, which includes a filling tube concentrically disposed on the support tube, said filling tube terminating upstream of the exit end of the support tube so that the filling compound is inserted into the metallic tube prior to inserting the light waveguide into the closed metallic tube.

* * * * *